United States Patent
Cho et al.

(10) Patent No.: US 12,431,729 B2
(45) Date of Patent: Sep. 30, 2025

(54) WIRELESS CHARGING RECEIVER INTEGRATED BATTERY MANAGEMENT SYSTEM AND METHOD

(71) Applicant: LG ENERGY SOLUTION, LTD., Seoul (KR)

(72) Inventors: Hyun Ki Cho, Daejeon (KR); Sang Hoon Lee, Daejeon (KR); Jae Dong Park, Daejeon (KR); Keun Wook Lee, Daejeon (KR); Ji Eun Kim, Daejeon (KR); Chan Ha Park, Daejeon (KR); Sung Gun Lee, Daejeon (KR); Seong Yeol Yang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 706 days.

(21) Appl. No.: 17/636,122

(22) PCT Filed: Sep. 7, 2020

(86) PCT No.: PCT/KR2020/012073
§ 371 (c)(1),
(2) Date: Feb. 17, 2022

(87) PCT Pub. No.: WO2021/049839
PCT Pub. Date: Mar. 18, 2021

(65) Prior Publication Data
US 2022/0294252 A1 Sep. 15, 2022

(30) Foreign Application Priority Data
Sep. 11, 2019 (KR) .................. 10-2019-0113168

(51) Int. Cl.
H02J 7/00 (2006.01)
H02J 50/10 (2016.01)
(Continued)

(52) U.S. Cl.
CPC ...... *H02J 7/00714* (2020.01); *H02J 7/00036* (2020.01); *H02J 7/0048* (2020.01);
(Continued)

(58) Field of Classification Search
CPC .. H02J 7/00714; H02J 7/00036; H02J 7/0048; H02J 7/005; H02J 50/10;
(Continued)

(56) References Cited

U.S. PATENT DOCUMENTS 6,184,651 B1   2/2001  Fernandez et al.
8,922,329 B2  12/2014  Davis et al.
(Continued)

FOREIGN PATENT DOCUMENTS

CN   107438935 A   12/2017
EP   2 685 153 A2   11/2013
(Continued)

OTHER PUBLICATIONS

International Search Report (PCT/ISA/210) issued in PCT/KR2020/012073, dated Dec. 8, 2020.
(Continued)

*Primary Examiner* — Zixuan Zhou
(74) *Attorney, Agent, or Firm* — Birch, Stewart, Kolasch & Birch, LLP

(57) ABSTRACT

Discussed is a battery management apparatus which includes a battery management system that monitors a state of a battery, and a power receiving device that wirelessly receives power from a power transmitting device, where the battery management system calculates an optimum charging condition for the battery based on data on the state of the battery and power transmission performance of the power transmitting device.

14 Claims, 9 Drawing Sheets

(51) Int. Cl.
  *H02J 50/12* (2016.01)
  *H02J 50/80* (2016.01)
  *B60R 16/033* (2006.01)
  *H02J 50/00* (2016.01)

(52) U.S. Cl.
  CPC .............. *H02J 7/005* (2020.01); *H02J 50/10* (2016.02); *H02J 50/12* (2016.02); *H02J 50/80* (2016.02); *B60R 16/033* (2013.01); *H02J 50/005* (2020.01)

(58) Field of Classification Search
  CPC .......... H02J 50/12; H02J 50/80; H02J 50/005; B60R 16/033
  USPC .................................. 320/108, 137; 307/104
  See application file for complete search history.

(56) References Cited

U.S. PATENT DOCUMENTS

| | | | |
|---|---|---|---|
| 2005/0062878 A1* | 3/2005 | Ogawa | H04N 23/634 |
| | | | 348/E5.042 |
| 2012/0293119 A1 | 11/2012 | Park et al. | |
| 2013/0154371 A1 | 6/2013 | Ju | |
| 2013/0307473 A1* | 11/2013 | Han | H02J 50/80 |
| | | | 320/108 |
| 2016/0016480 A1 | 1/2016 | Kim et al. | |
| 2016/0043590 A1 | 2/2016 | Ha et al. | |
| 2016/0152149 A1 | 6/2016 | Misawa | |
| 2016/0226296 A1 | 8/2016 | Bae et al. | |
| 2016/0268833 A1 | 9/2016 | Lee et al. | |
| 2018/0013314 A1 | 1/2018 | Liu | |
| 2018/0159359 A1 | 6/2018 | Park et al. | |
| 2018/0342902 A1 | 11/2018 | Bae et al. | |
| 2019/0067755 A1 | 2/2019 | Kim et al. | |
| 2019/0140470 A1 | 5/2019 | Wan et al. | |
| 2019/0288561 A1 | 9/2019 | Bae et al. | |
| 2019/0305580 A1* | 10/2019 | Lee | H02J 50/80 |
| 2019/0326768 A1 | 10/2019 | Park et al. | |
| 2019/0356153 A1 | 11/2019 | Wan et al. | |
| 2019/0356154 A1 | 11/2019 | Wan et al. | |
| 2019/0386516 A1 | 12/2019 | Wan et al. | |
| 2020/0014235 A1 | 1/2020 | Lin et al. | |
| 2020/0021129 A1 | 1/2020 | Lin et al. | |
| 2020/0021148 A1 | 1/2020 | Lin et al. | |
| 2020/0036216 A1 | 1/2020 | Wan | |
| 2021/0288526 A1 | 9/2021 | Lee et al. | |

FOREIGN PATENT DOCUMENTS

| | | |
|---|---|---|
| JP | 2015-53754 A | 3/2015 |
| JP | 2016-103947 A | 6/2016 |
| JP | 2016-131436 A | 7/2016 |
| KR | 10-2006-0107147 A | 10/2008 |
| KR | 10-1299269 B1 | 8/2013 |
| KR | 10-2013-0128565 A | 11/2013 |
| KR | 10-2015-0031064 A | 3/2015 |
| KR | 10-2016-0017626 A | 2/2016 |
| KR | 10-1664551 B1 | 10/2016 |
| KR | 10-2018-0005853 A | 1/2018 |
| KR | 10-1896979 B1 | 9/2018 |
| KR | 10-1923958 B1 | 11/2018 |
| KR | 10-2019-0023295 A | 3/2019 |
| KR | 10-2019-0038918 A | 4/2019 |
| KR | 10-1973051 B1 | 4/2019 |
| KR | 10-2016-0110023 A | 6/2025 |

OTHER PUBLICATIONS

Extended European Search Report for European Application No. 20862994.9, dated Apr. 13, 2023.

* cited by examiner

WIRELESS CHARGING RECEIVER INTEGRATED BATTERY MANAGEMENT SYSTEM AND METHOD

CROSS-REFERENCE TO RELATED APPLICATIONS

This application claims the benefit of Korean Patent Application No. 10-2019-0113168, filed on Sep. 11, 2019, in the Korean Intellectual Property Office, the disclosure of which is incorporated herein in its entirety by reference.

TECHNICAL FIELD

The present invention relates to a wireless charging receiver integrated battery management system and method.

BACKGROUND ART

Most of batteries used in automobiles are built in the form of cell-module-packs. Conventionally, charging and discharging of such a battery has no choice but to discharge all cells simultaneously or charge all cells simultaneously through positive and negative terminals of a battery pack.

However, in general battery cell modules, there are variations according to cooling performance, etc., depending on their location inside a battery pack, and thus functional differences such as variations in life between the battery modules occur over time.

Accordingly, it is necessary to grasp a state of a battery for each module in real time and charge the battery with a charging current suitable for the state of each battery.

DISCLOSURE OF THE INVENTION

Technical Problem

An object of the present invention is to provide a battery system that performs charging to suit a state of a battery for each module by integrating a wireless charging receiver into a battery management system and controlling a power transmission condition of the wireless charging transmitter according to an optimum charging condition calculated based on factors that change according to a charging environment of the battery.

Technical Solution

A battery system according to an embodiment of the present invention includes a battery management system that monitors a state of a battery, and a power receiving device that wirelessly receives power from a power transmitting device, and the battery management system calculates an optimum charging condition for the battery based on data on a state of the battery and power transmission performance of the power transmitting device.

In the battery system according to the embodiment of the present invention, the battery management system may wirelessly communicate with the power transmitting device.

In the battery system according to the embodiment of the present invention, the battery system may wirelessly receive data on a power transmission condition from the power transmitting device.

In the battery system according to the embodiment of the present invention, the power transmission performance of the power transmitting device may include real-time power transmission efficiency and maximum available transmission power.

In the battery system according to the embodiment of the present invention, the data on the state of the battery may include a maximum available charging current of the battery, a real-time remaining battery capacity, and a remaining battery life.

In the battery system according to the embodiment of the present invention, the battery management system and the power receiving device may be electrically coupled.

In the battery system according to the embodiment of the present invention, the battery management system may measure an input voltage and an input current of the battery and an output voltage and an output current of the power receiving device in real time.

In the battery system according to the embodiment of the present invention, the battery management system may calculate the optimum charging condition according to at least one criterion of wireless charging efficiency, wireless charging speed, and battery life.

In the battery system according to the embodiment of the present invention, the battery management system may control the power transmission performance of the power transmitting device based on the optimum charging condition.

In the battery system according to the embodiment of the present invention, the battery management system may adjust a duty and a frequency of the power transmitting device when a difference value between the calculated optimum charging condition and a preset reference value is greater than or equal to a threshold value.

A power transmitting device according to an embodiment of the present invention includes a transmission circuit that wirelessly transmits power to a power receiving device, a communication unit that wirelessly transmits data on a power transmission condition to a battery management system and wirelessly receives a power control signal according to an optimum charging condition of a battery calculated from the battery management system, and a controller that adjusts a power transmission condition transmitted to the power receiving device based on a power control signal according to the optimum charging condition.

A battery management method according to an embodiment of the present invention includes wirelessly transmitting power for supply to a battery from a power transmitting device to a power receiving device, monitoring a state of the battery, receiving data on a power transmission condition from the power transmitting device, and calculating an optimum charging condition of the battery based on data on the state of the battery and the data on the power transmission condition received from the power transmitting device.

The battery management method according to the embodiment of the present invention may further include adjusting the power transmission condition of the power transmitting device based on an optimum charging condition of the battery.

Effects of the Invention

According to the battery system of the present invention, charging may be performed to suit a state of a battery for each module by integrating a wireless charging receiver into a battery management system and controlling a power transmission condition of a wireless charging transmitter according to an optimum charging condition calculated based on factors that change according to a charging environment of the battery.

MODE FOR CARRYING OUT THE INVENTION

Figure 1:
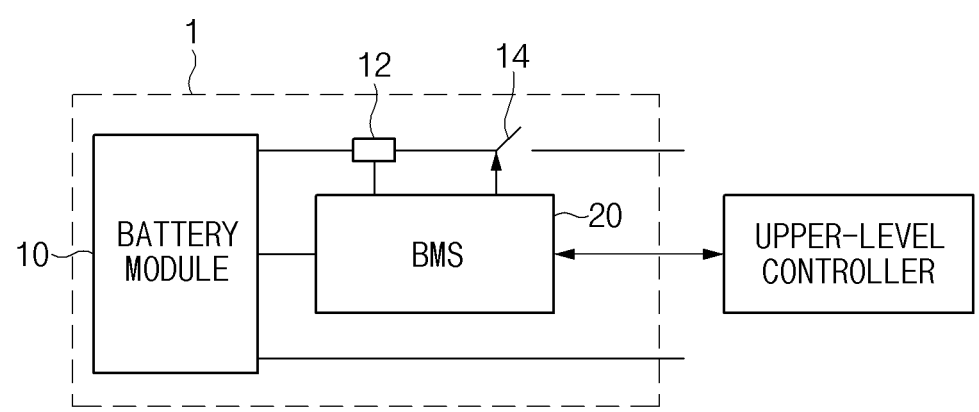
FIG. 1 is a block diagram illustrating a configuration of a general battery management system.

Hereinafter, various embodiments of the present invention will be described in detail with reference to the accompanying drawings. In this document, the same reference numerals are used for the same constituent elements in the drawings, and duplicate descriptions for the same constituent elements are omitted. With respect to the various embodiments of the present invention disclosed in this document, specific structural or functional descriptions have been exemplified for the purpose of describing the embodiments of the present invention only, and various embodiments of the present invention may be embodied in various forms and should not be construed as being limited to the embodiments described in this document. Expressions such as "first", "second", "firstly", or "secondly", etc. used in various embodiments may modify various constituent elements regardless of order and/or importance, and do not limit corresponding constituent elements. For example, without deviating from the scope of the present invention, a first constituent element may be named as a second constituent element, and similarly, the second constituent element may also be renamed as the first constituent element.

The terms used in this document are only used to describe a specific embodiment, and are not intended to limit the scope of other embodiments. Singular expressions may include plural expressions unless the context clearly indicates otherwise.

FIG. 1 is a block diagram illustrating a configuration of a general battery management system.

Specifically, FIG. 1 is a block diagram schematically illustrating a battery management system including a battery pack 1 and an upper-level controller 2 included in an upper-level system, according to an embodiment of the present invention.

As illustrated in FIG. 1, the battery pack 1 includes a battery module 10 composed of one or more battery cells and capable of charging and discharging, a switching unit 14 connected in series to a positive terminal side or a negative terminal side of the battery module 10 to control a flow of charging and discharging current of the battery module 10, and a battery management system 20 that monitors a voltage, current, temperature, etc. of the battery pack 1 to control and manage the battery module 10 to prevent over-charging, over-discharging, etc.

Here, the switching unit 14 is a semiconductor switching element for controlling a current flow for charging or discharging of the battery module 10, and, for example, at least one MOSFET may be used.

In addition, the BMS 20 may measure or calculate a voltage and current of a gate, source, and drain of the semiconductor switching element in order to monitor the voltage, current, temperature, etc. of the battery pack 1, and may measure the current, voltage, temperature, etc. of the battery pack using a sensor 12 provided adjacent to the semiconductor switching element 14. The BMS 20 is an interface that receives values obtained by measuring various parameters described above, and may include a plurality of terminals and a circuit connected to these terminals to perform processing for input values.

In addition, the BMS 20 may control ON/OFF of the switching element 14, for example, a MOSFET, and may be connected to the battery module 10 to monitor a state of the battery module 10.

The upper controller 2 may transmit a control signal for the battery module to the BMS 20. Accordingly, an operation of the BMS 20 may be controlled based on a signal applied from the host controller. The battery cell of the present invention may be configured to be included in a battery pack used in an energy storage system (ESS) or a vehicle, etc. However, the battery cell of the present invention is not limited to these uses.

Since the configuration of the battery pack 1 and the configuration of the BMS 20 are known configurations, a more detailed description thereof will be omitted.

Figure 2:
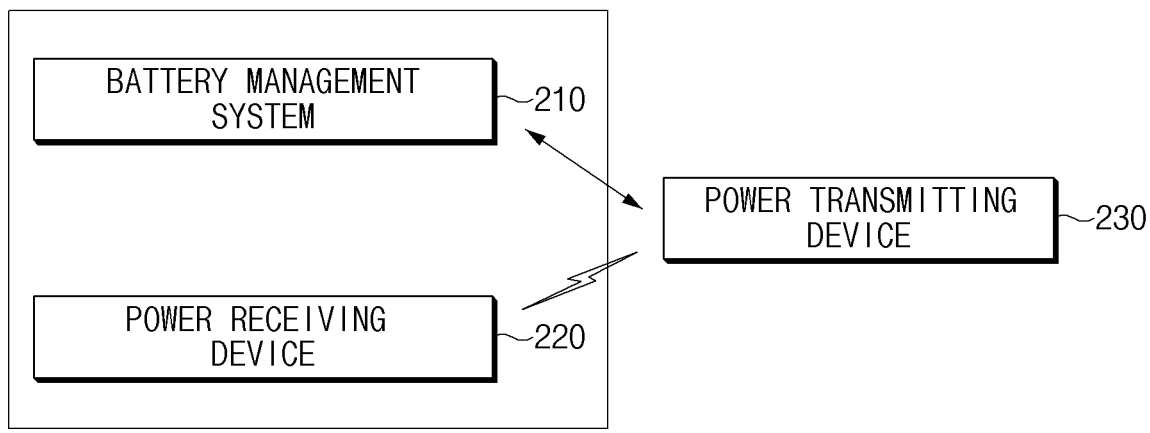
FIG. 2 is a block diagram illustrating a configuration of a battery system according to an embodiment of the present invention.

FIG. 2 is a block diagram illustrating a configuration of a battery system according to an embodiment of the present invention.

Referring to FIG. 2, a battery system 200 according to an embodiment of the present invention may include a battery management system 210, a power receiving device 220, and a power transmitting device 230. As illustrated in FIG. 2, in the battery system 200 according to the embodiment of the present invention, the battery management system 210 and the power receiving device 220 are connected to each other. In addition, the power transmitting device 230 may wirelessly transmit and receive data to and from the battery management system 210 and may wirelessly supply power to the power receiving device 220. This will be described later.

The battery management system 210 may monitor the state of the battery. Specifically, the battery management system 210 may measure the voltage, current, temperature, SOC, etc. of the battery cell. In addition, the battery management system 210 may detect the maximum available charging current of the battery, the real-time remaining battery capacity, and the remaining battery life as data on the state of the battery.

In addition, the battery management system 210 may wirelessly communicate with the power receiving device 220 and the power transmitting device 230. Accordingly, the battery management system 210 may wirelessly receive data on a power transmission condition from the power transmitting device 230. The battery management system 210 may measure an input voltage and an input current of the battery, and an output voltage and an output current of the power receiving device 220 in real time. In this case, the battery management system 210 may wirelessly receive the output voltage and the output current from the power receiving device 220.

The battery management system 210 may calculate an optimum charging condition for the battery based on data on the measured state of the battery and power transmission performance of the power transmitting device 230. In this case, the optimum charging condition may be calculated according to at least one criterion of wireless charging efficiency, wireless charging speed, and battery life. However, the present invention is not limited thereto, and various criteria may be applied depending on the case.

The battery management system 210 may control power transmission performance of the power transmitting device 230 based on the calculated optimum charging condition. In this case, for example, the battery management system 210 may control the power transmitting device 230 by transmitting a power control signal according to the optimum charging condition to the power transmitting device 230. The battery management system 210 may adjust a duty and a frequency of the power transmitting device 230 when a difference value between the calculated optimum charging condition and the preset reference value is greater than or equal to a threshold value.

The power receiving device 220 may wirelessly receive power from the power transmitting device 230. In this case, the power receiving device 220 may wirelessly transmit the received power to the battery management system 210.

In addition, the power receiving device 220 may be electrically coupled with the battery management system 210. That is, according to the battery system 200 according to the exemplary embodiment of the present invention, the power receiving device 220 may be integrated into the battery management system 210 to be incorporated into the battery cell module assembly together. For example, the power receiving device 220 may be incorporated in the lower part of the battery management system 210.

The power transmitting device 230 may wirelessly communicate with the battery management system 210 and the power receiving device 220. In this case, the power transmitting device 230 may transmit data on the power transmission condition (e.g., power transmission amount, maximum available transmission power, etc.) to the battery management system 210, and receive the power control signal from the battery management system 210.

In addition, the power transmission performance of the power transmitting device 230 used for calculating the optimum charging condition in the battery management system 210 may include real-time power transmission efficiency and the maximum available transmission power.

As described above, according to the battery system 200 according to the embodiment of the present invention, factors (e.g., coupling, resonance quality factor, etc.) that change according to a charging environment such as distance and alignment between coils, resonance frequency, and temperature may be estimated by measuring the input and output voltage and current of the battery, the output voltage and current of the wireless receiver 220, and the amount of power transmission of the power transmitting device 230, and optimum points of wireless charging efficiency, charging speed, and battery life may be selected and controlled.

Figure 3:
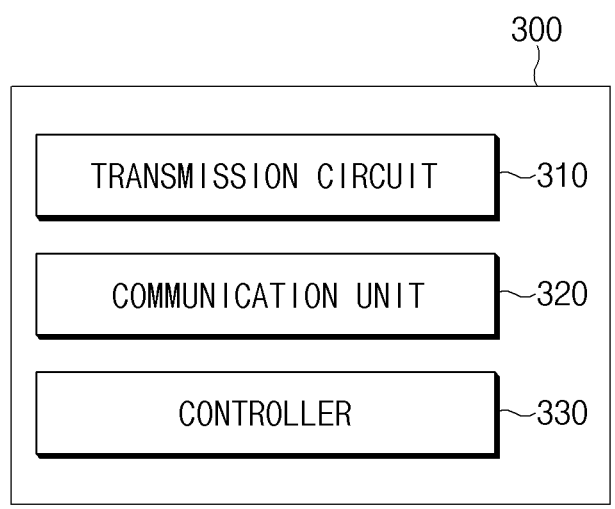
FIG. 3 is a block diagram illustrating a configuration of a power transmitting device according to an embodiment of the present invention.

FIG. 3 is a block diagram illustrating a configuration of a power transmitting device according to an embodiment of the present invention.

A power transmitting device 300 according to an embodiment of the present invention may include a transmission circuit 310, a communication unit 320, and a controller 330.

The transmission circuit 310 may wirelessly transmit power to the power receiving device 220. For example, as will be described later, the transmission circuit 310 may include a coil, and transmit power in the form of electromagnetic induction or transmit power using resonance according to a resonance frequency.

The communication unit 320 may wirelessly transmit data on the power transmission condition to the battery management system 210, and wirelessly receive the power control signal according to the optimum charging condition of the battery calculated from the battery management system 210.

The controller 330 may adjust the power transmission condition transmitted to the power receiving device 220 based on the power control signal according to the optimum charging condition received from the battery management system 210. For example, the controller 330 may adjust the duty, the frequency, etc. of the power transmitting device 300.

As described above, according to the battery system of the present invention, charging may be performed to suit the state of the battery for each module by integrating the wireless charging receiver into the battery management system and controlling the power transmission condition of the wireless charging transmitter according to the optimum charging condition calculated based on factors that change according to the charging environment of the battery.

Figure 4A:
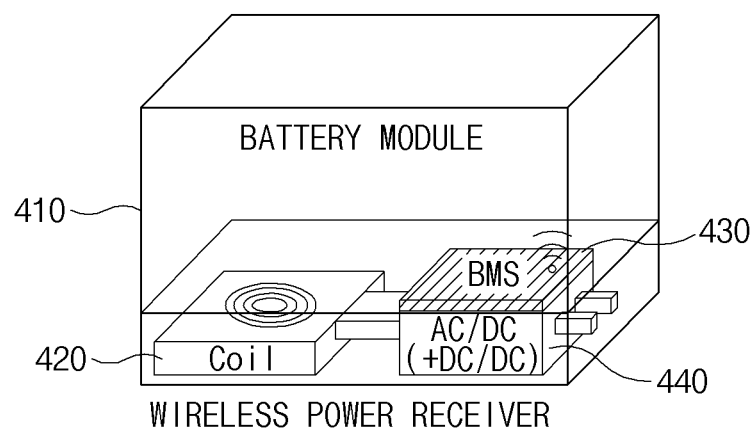
FIG. 4A is a diagram illustrating a configuration of a battery module according to an embodiment of the present invention.

FIG. 4A is a diagram illustrating a configuration of a battery module according to an embodiment of the present invention.

Referring to FIG. 4A, the battery module 410 according to the embodiment of the present invention may include a coil 420, a battery management system (BMS) 430, and a rectifier (AC/DC) 440.

The coil is included in the power receiving device and may wirelessly receive power from the power transmitting device. In this case, the coil may receive power in the form of magnetic induction or receive power by using a resonance phenomenon according to a resonance frequency.

The battery management system (BMS) may monitor the state of the battery cell module assembly and control the power transmitting device according to the optimum charging condition. The function of the battery management system has been described in FIG. 2, and thus a detailed description thereof will be omitted.

The rectifier (AC/DC) may rectify the power received from the power transmitting device from alternating current (AC) to direct current (DC).

Figure 4B:
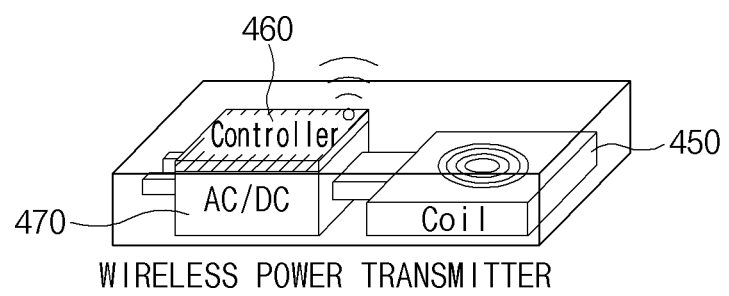
FIG. 4B is a diagram illustrating a configuration of a power transmitting device according to an embodiment of the present invention.

FIG. 4B is a diagram illustrating a configuration of a power transmitting device according to an embodiment of the present invention.

Referring to FIG. 4B, the power transmitting device according to the embodiment of the present invention may include a coil 450, a controller 460, and the rectifier (AC/DC) 470.

The coil may wirelessly transmit power to the power receiving device. Like the power receiving device, the coil of the power transmitting device may receive power in the form of magnetic induction or receive power by using a resonance phenomenon according to a resonance frequency.

The controller may adjust the power transmission condition transmitted from the power transmitting device. For example, the controller may adjust the power transmission amount, duty, frequency, etc. of the power transmitting device, and control power according to the optimum charging condition based on the power control signal received from the battery management system (BMS) of the battery module.

The rectifier (AC/DC) may rectify the power received from the power transmitting device from AC to DC.

Figure 5:
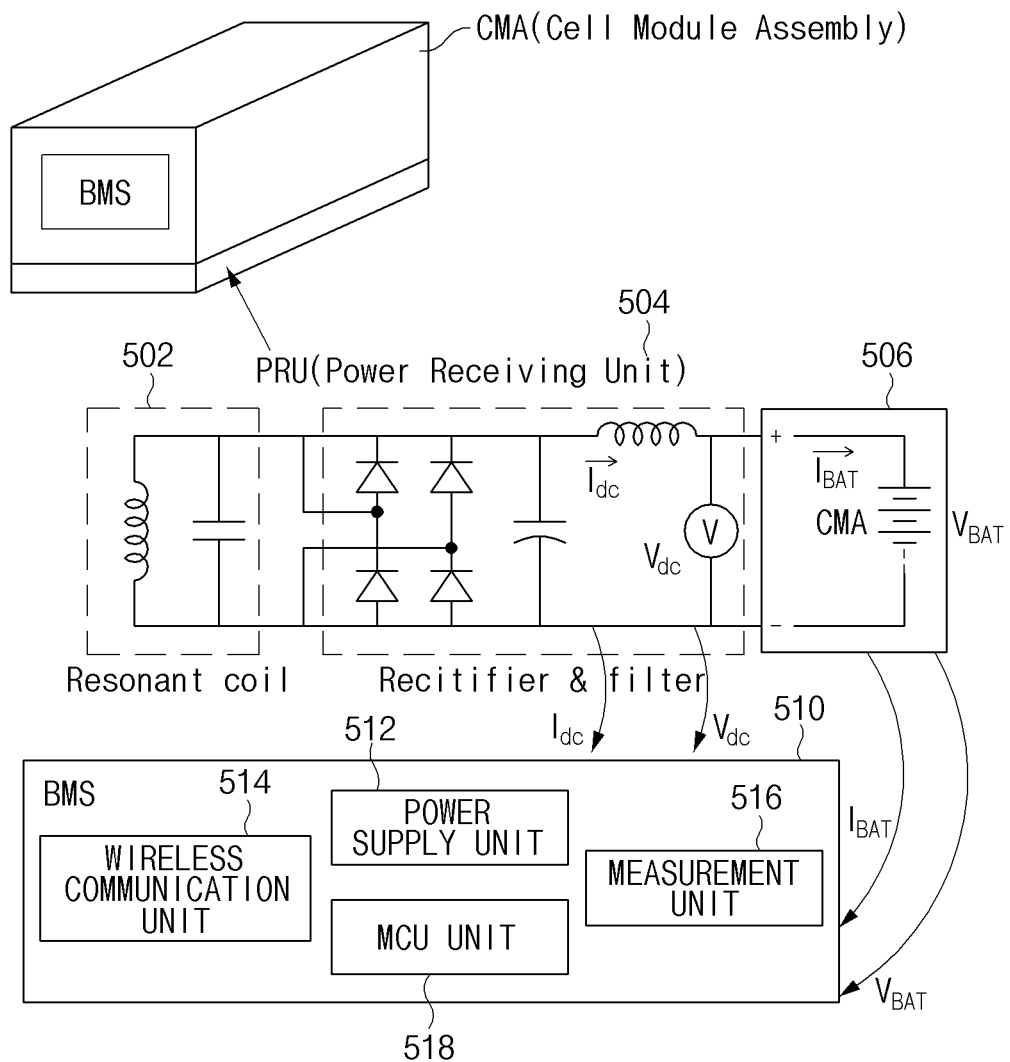
FIG. 5 illustrates a circuit diagram of a battery cell module assembly according to an embodiment of the present invention

FIG. 5 is illustrates a circuit diagram of a battery cell module according to an embodiment of the present invention.

Referring to FIG. 5, the battery cell module according to the embodiment of the present invention may include a resonant coil 502, a rectifier and filter 504, and a cell module assembly; (CMA) 506, and a battery management system (BMS) 510. In addition, the battery management system 510 may include a power supply unit 512, a wireless communication unit 514, a measurement unit 516, and an MCU (microcontroller) unit 518.

The resonance coil 502 may include an inductor and a capacitor, and may be included in a power receiving device to wirelessly receive power from the power transmitting device. The coil of FIG. 5 may receive power by using a resonance phenomenon according to a resonance frequency. However, the present invention is not limited, and the coil may receive power in the form of magnetic induction.

The rectifier and filter 504 may rectify the output voltage and output current of the power receiving unit and remove noise.

The battery cell module assembly 506 has a structure in which a plurality of battery cells are combined, and the voltage and current input to the battery cell module assembly may be measured to estimate states such as the maximum available charging current, real-time remaining capacity, remaining battery life of the battery, etc., by the battery management system 510.

The battery management system 510 may monitor the states of the battery voltage, current, temperature, SOC, etc. In addition, the battery management system 510 may calculate the optimum charging condition of the battery based on the data on the measured state of the battery and the power transmission performance of the power transmitting device.

The power supply unit 512 supplies power for the battery management system 510 to perform a function of the battery management system 510. In addition to supplying power by itself, the power supply unit 512 may wirelessly receive power from the power receiving device integrated in the battery management system 510.

The wireless communication unit 514 may wirelessly communicate with the power receiving device and the power transmitting device. For example, the wireless communication unit 514 may receive data on the output voltage and output current from the power receiving device, and data on the power transmission condition (e.g., power transmission amount, maximum available transmission power, etc.), etc.

The measurement unit 516 may measure the state of the battery cell. For example, the measurement unit 516 may function as a sensor that measures the voltage, current, temperature, SOC, etc. of the battery. In addition, the measurement unit 516 may detect data on the state of the battery such as the maximum available charging current of the battery, real-time remaining battery capacity, and remaining battery life.

The MCU unit 518 may calculate an optimum charging condition of the battery based on the data on the state of the battery measured by the measurement unit 516 and the power transmission performance of the power transmitting device. In this case, the optimum charging condition may be calculated according to at least one criterion of the wireless charging efficiency, wireless charging speed, and battery life.

In addition, the MCU unit 518 may control power transmission performance of the power transmitting device based on the calculated optimum charging condition. For example, the MCU unit 518 may control the power transmitting device by transmitting a power control signal according to the optimum charging condition to the power transmitting device through the wireless communication unit 514. In this case, the MCU unit 518 may transmit a signal for adjusting the duty and frequency of the power transmitting device when the difference value between the calculated optimum charging condition and the preset reference value is greater than or equal to the threshold value.

Figure 6:
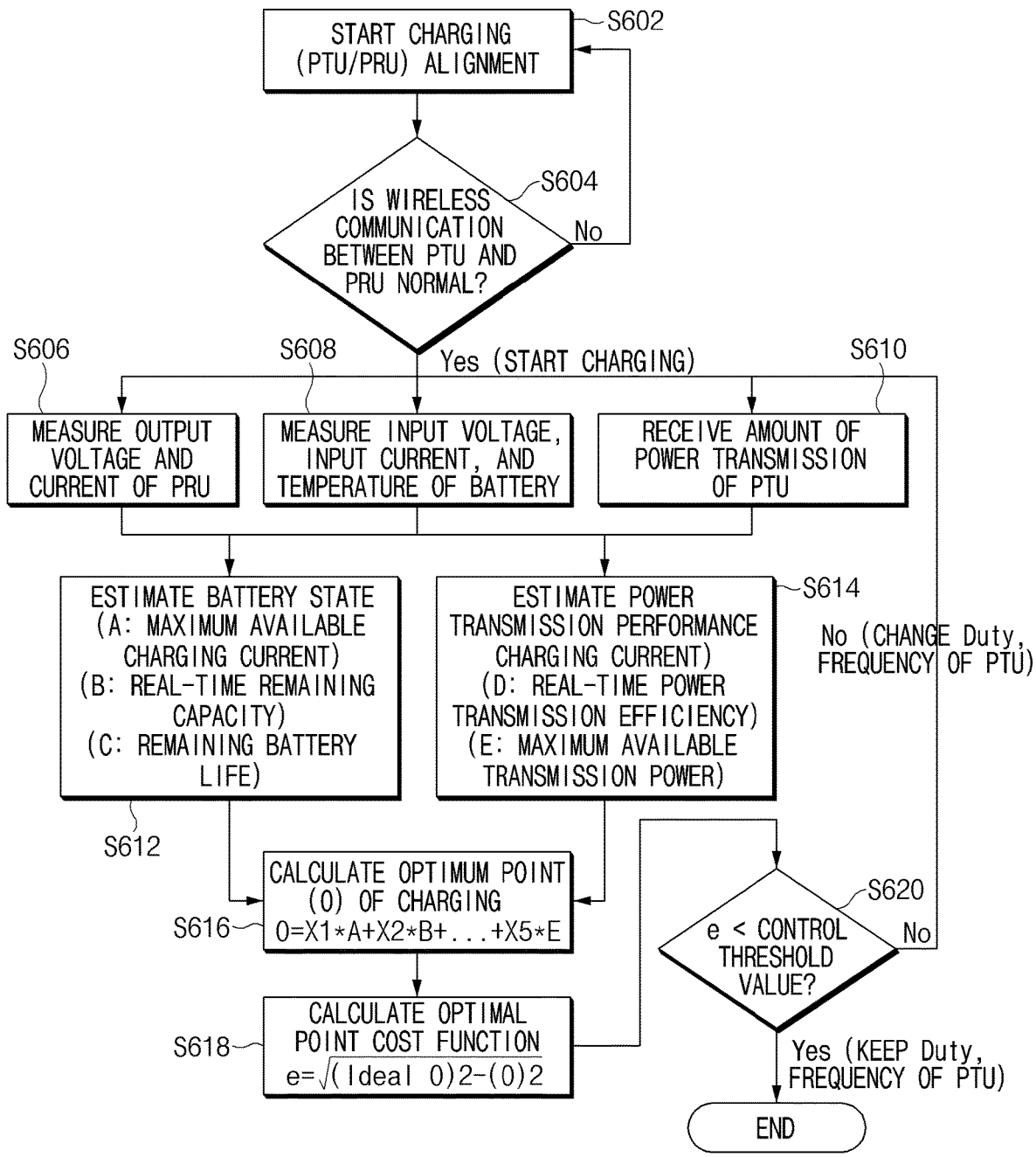
FIG. 6 is a flowchart illustrating a specific example of a battery management method according to an embodiment of the present invention.

FIG. 6 is a flowchart illustrating a specific example of a battery management method according to an embodiment of the present invention.

Referring to FIG. 6, first, when charging of the battery starts, a power transmitting unit (PTU) and a power receiving unit (PRU) are aligned (S602). Then, it is checked whether or not wireless communication between the power transmitting unit and the power receiving unit is normally performed (S604).

When it is checked that the wireless communication between the power transmitting unit and the power receiving unit is not normally performed, the process returns to operation S602 and the power transmitting unit and the power receiving unit are realigned. When it is checked that wireless communication between the power transmitting unit and the power receiving unit is normally performed in operation S604, the output voltage and the output current of the power receiving unit are measured (S606). In this case, the output voltage and output current of the power receiving unit may be measured by the battery management system.

Then, the input voltage, input current, and temperature of the battery cell are measured (S608). In this case, the input voltage, input current, and temperature of the battery cell may be measured by the battery management system. In operation S610, the power transmission condition (amount of power transmission in FIG. 6) of the power transmitting unit is received. In this case, the power transmission condition of the power transmitting unit may be wirelessly received from the power transmitting unit to the battery management system.

In operation S612, maximum available charging current A, real-time remaining capacity B, and remaining battery life C of the battery are calculated. In this case, each parameter value may be calculated based on the data on the state of the battery measured by the battery management system.

Also, based on the power transmission condition received from the power transmitting unit, real-time power transmission efficiency D and maximum available transmission power E may be calculated. In this case, the output voltage and output current measured by the power receiving unit may be used.

In operation S616, an optimum point of charging O is calculated according to at least one criterion of the maximum available current A, the real-time remaining capacity B, the remaining battery life C, the real-time power transmission efficiency D, and the maximum available transmission power E calculated in operations S612 and S614. Here, the optimum point of charging O may vary according to at least one criterion of wireless charging efficiency, wireless charging speed, and battery life.

In addition, as illustrated in FIG. 6, the optimum point of charging O may be calculated as $X1*A+X2*B+X3*C+X4*D+X5*$. In this case, X1 to X5 are weights respectively applied to variables, and may be set by a user according to an environment that affects the state of the battery and power transmission performance. In operation S618 an optimum point cost function e, which is a difference value between the calculated optimum point of charging O and Ideal O, which is a reference value, is calculated. In this case, Ideal O may be a theoretical value calculated according to the charging environment of the battery, and is not limited thereto, and may be an experimental value calculated by experimenting according to the environment.

When the optimum point cost function e is less than a control threshold (YES) at operation S620, the optimum point (0) of charging calculated in real time is close to the reference value, and the power transmission conditions, e.g., duty and frequency, of the power transmitting unit are kept in the current state.

On the other hand, when the optimum point cost function e is greater than or equal to the control threshold (NO) at operation S620, the power transmission conditions, e.g., the duty and frequency, of the power transmitting unit are changed, and then the process return to operations S606 to S610 and the measurement is performed.

As described above, according to the battery management method according to the embodiment of the present invention, factors (e.g., coupling, resonance quality factor, etc.) that change according to a charging environment such as distance and alignment between coils, resonance frequency, and temperature may be estimated by measuring the input and output voltage and current of the battery, the output voltage and current of the power receiving unit, and the amount of power transmission of the power transmitting unit, and optimum points of wireless charging efficiency, charging speed, and battery life may be selected and controlled.

Figure 7:
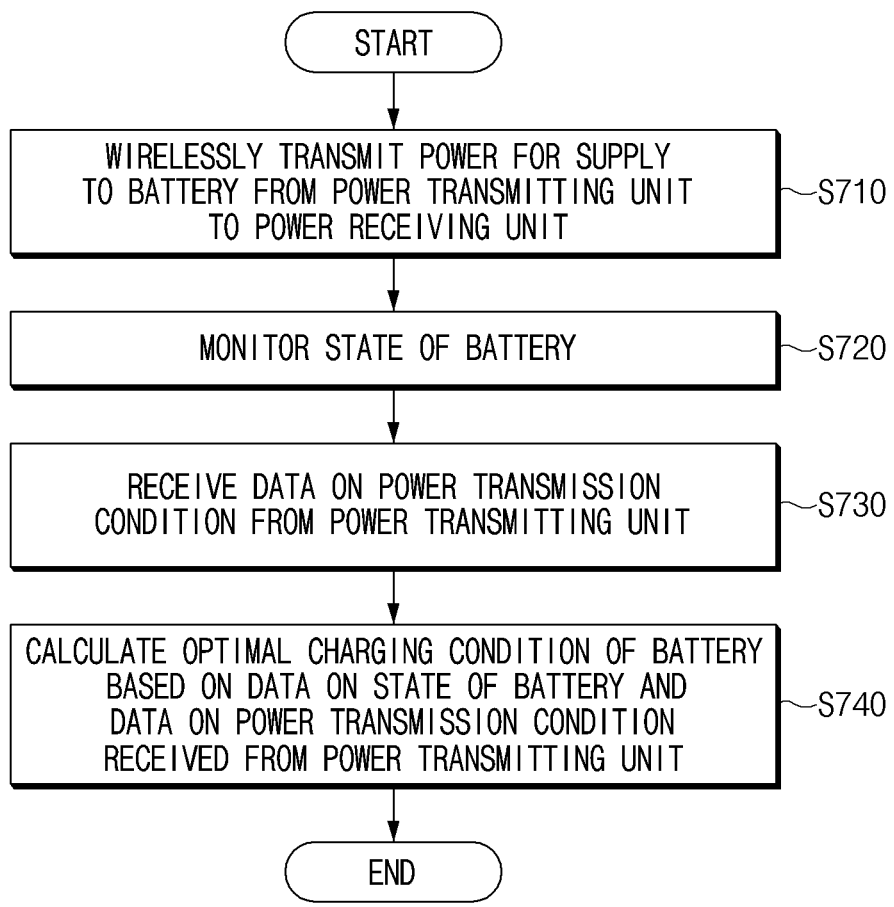
FIG. 7 is a flowchart illustrating of a battery management method according to an embodiment of the present invention.

FIG. 7 is a flowchart illustrating the battery management method management according to the embodiment of the present invention.

Referring to FIG. 7, first, power for supply to a battery from the power transmitting device to the power receiving device is wirelessly transmitted (S710). The battery management system (BMS) monitors the state of the battery (S720).

In this case, the battery management system may measure the voltage, current, temperature, SOC, etc. of the battery cell. In addition, as data on the state of the battery, the maximum available charging current of the battery, real-time remaining battery capacity, and remaining battery life may be detected.

In addition, in operation S720, the battery management system may measure the input voltage and input current of the battery, and the output voltage and output current of the power receiving device in real time. In this case, the output voltage and output current may be wirelessly received from the power receiving device.

Next, in operation S730, the battery management system may receive data on the power transmission condition from the power transmitting device. For example, the power transmission condition may include the amount of power transmission, real-time transmission efficiency, and maximum available transmission power.

Then, the optimum charging condition of the battery is calculated based on the data on the state of the battery measured in operation S720 and the data on the power transmission condition received from the power transmitting device in operation S730. In this case, the optimum charging condition may be calculated according to at least one criterion of wireless charging efficiency, wireless charging speed, and battery life. However, the present invention is not limited thereto, and various criteria may be applied depending on the case.

In addition, although not illustrated in FIG. 7, the battery management method according to the embodiment of the present invention may further include adjusting the power transmission condition of the power transmitting device based on the optimum charging condition of the battery calculated in operation S740. In this case, when the difference value between the calculated optimum charging condition and the preset reference value is greater than or equal to the threshold value, the duty and frequency of the power transmitting device may be adjusted.

As described above, according to the battery management method of the present invention, charging may be performed to suit the state of the battery for each module by integrating the wireless charging receiver into the battery management system and controlling the power transmission condition of the wireless charging transmitter according to the optimum charging condition calculated based on factors that change according to the charging environment of the battery.

Figure 8:
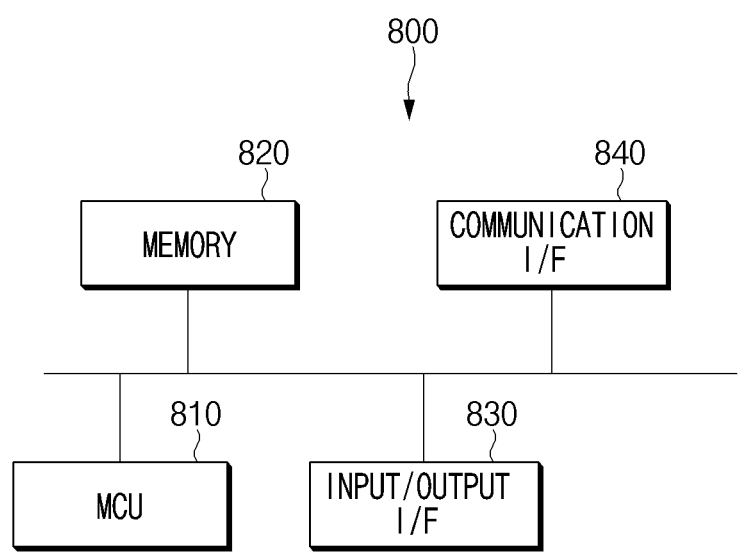
FIG. 8 is a diagram illustrating a hardware configuration of a battery system according to an embodiment of the present invention.

FIG. 8 is a diagram illustrating a hardware configuration of a battery system according to an embodiment of the present invention.

As illustrated in FIG. 8, the battery system 800 may include a microcontroller (MCU) 810 that controls various processing and each configuration, a memory 820 in which an operating system program and various programs (e.g., a battery pack abnormality diagnosis program or a battery pack temperature estimation program) are recorded, an input/output interface 830 that provides input interface and output interface between a battery cell module and/or a switching unit (e.g., a semiconductor switching device), and a communication interface 840 capable of communicating with the outside (for example, an upper-level controller) through a wired or wireless communication network. In this way, a computer program according to the present invention may be recorded in the memory 820 and processed by the microcontroller 810, thereby capable of being implemented as, for example, a module that performs each functional block illustrated in FIGS. 2 and 3.

In the above description, just because all the constituent elements constituting an embodiment of the present invention are described as being combined into one or operating in combination, the present invention is not necessarily limited to these embodiments. That is, as long as it is within the scope of the object of the present invention, all of the constituent elements may be selectively combined and operated in one or more.

In addition, the terms such as "include", "configure" or "have" described above mean that the corresponding constituent element may be embedded unless otherwise described, and thus the terms should be interpreted as being capable of further including other constituent elements, rather than excluding other constituent elements. All terms used herein including technical or scientific terms may have the same meaning as generally understood by a person of ordinary skill in the art, unless otherwise defined. Terms generally used, such as terms defined in the dictionary, should be interpreted as being consistent with the meaning of the context of related technology, and are not to be interpreted as an ideal or excessively formal meaning unless explicitly defined in the present invention.

The above description is merely illustrative of the technical idea of the present invention, and those of ordinary skill in the art to which the present invention pertains will be able to make various modifications and variations without deviating from the essential characteristics of the present invention. Accordingly, the embodiments disclosed in the present invention are not intended to limit the technical idea of the present invention, but to explain the technical idea, and the scope of the technical idea of the present invention is not limited by these embodiments. The scope of protection of the present invention should be interpreted by the claims set forth below, and all technical ideas within the scope equivalent thereto should be construed as being included in the scope of the present invention.

The invention claimed is:

1. A battery system comprising:
a battery management system that monitors a state of a battery; and
a power receiving device that wirelessly receives power from a power transmitting device,
wherein the battery management system calculates an optimum charging condition for the battery based on data on the state of the battery and a power transmission performance of the power transmitting device,
wherein the power receiving device is integrated into the battery management system, and
wherein the battery management system adjusts a duty and a resonance frequency of the power transmitting device when a difference value between the calculated optimum charging condition and a preset reference value is greater than or equal to a threshold value.

2. The battery system of claim 1,
wherein the battery management system wirelessly communicates with the power transmitting device.

3. The battery system of claim 2,
wherein the battery management system wirelessly receives data on a power transmission condition from the power transmitting device.

4. The battery system of claim 3,
wherein the power transmission performance of the power transmitting device includes at least one of real-time power transmission efficiency and maximum available transmission power.

5. The battery system of claim 1,
wherein the data on the state of the battery includes at least one of a maximum available charging current of the battery, a real-time remaining battery capacity, and a remaining battery life.

6. The battery system of claim 1,
wherein the battery management system and the power receiving device are electrically coupled.

7. The battery system of claim 1,
wherein the battery management system measures an input voltage and an input current of the battery and an output voltage and an output current of the power receiving device in real time.

8. The battery system of claim 1,
wherein the battery management system calculates the optimum charging condition according to at least one criterion of wireless charging efficiency, wireless charging speed, and battery life.

9. The battery system of claim 1,
wherein the battery management system controls the power transmission performance of the power transmitting device based on the optimum charging condition.

10. The battery system of claim 1, wherein the power receiving device and the battery management system are incorporated together into a battery cell module assembly.

11. A power transmitting device comprising:
a transmission circuit that wirelessly transmits power to a power receiving device;
a communication unit that wirelessly transmits data on a power transmission condition to a battery management system and wirelessly receives a power control signal according to an optimum charging condition of a battery calculated from the battery management system; and
a controller that adjusts a power transmission condition transmitted to the power receiving device based on a power control signal according to the optimum charging condition,
wherein the power receiving device is integrated into the battery management system, and
wherein the battery management system adjusts a duty and a resonance frequency of the power transmitting device when a difference value between the calculated optimum charging condition and a preset reference value is greater than or equal to a threshold value.

12. A battery management method comprising:
wirelessly transmitting power for supply to a battery from a power transmitting device to a power receiving device;
monitoring a state of the battery;
receiving data on a power transmission condition from the power transmitting device; and
calculating an optimum charging condition of the battery based on data on the state of the battery and the data on the power transmission condition received from the power transmitting device; and
adjusting a duty and a resonance frequency of the power transmitting device when a difference value between the calculated optimum charging condition and a preset reference value is greater than or equal to a threshold value,
wherein the power receiving device is integrated into the battery management system.

13. The battery management method of claim 12, further comprising:
adjusting the power transmission condition of the power transmitting device based on the optimum charging condition of the battery.

14. The battery management method of claim 12, wherein the power receiving device and the battery management system are incorporated together into a battery cell module assembly.

* * * * *